Inventor:—
Vincent Oliver Stone,
by Pierce, Scheffler & Parker,
Attorneys.

Jan. 29, 1952 V. O. STONE 2,584,062
MACHINE VISE HAVING JAWS MOVABLE DOWNWARDLY
WHEN PRESSED AGAINST WORKPIECE
Filed Dec. 19, 1950 2 SHEETS—SHEET 2
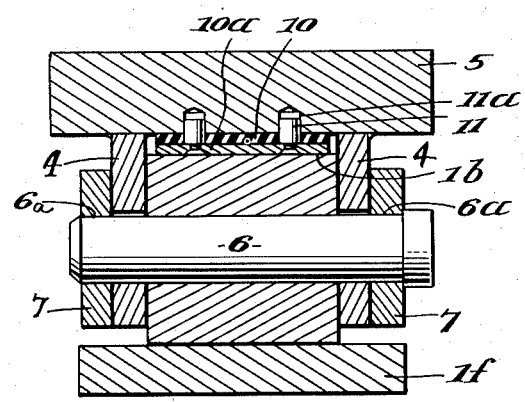
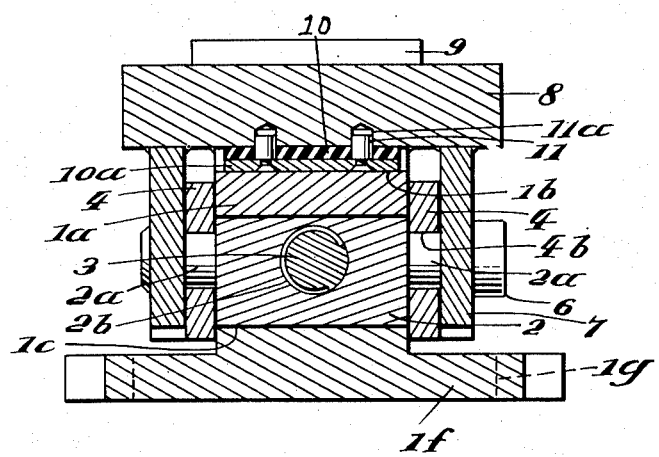
INVENTOR
Vincent Oliver Stone
BY Pierce, Scheffler & Parker
ATTORNEYS Patented Jan. 29, 1952

2,584,062

UNITED STATES PATENT OFFICE 2,584,062

MACHINE VISE HAVING JAWS MOVABLE DOWNWARDLY WHEN PRESSED AGAINST WORKPIECE

Vincent Oliver Stone, Alperton, Wembley, England, assignor to The Glacier Metal Company Limited, Alperton, Wembley, England, a British company Application December 19, 1950, Serial No. 201,507
In Great Britain April 22, 1949

6 Claims. (Cl. 90—61)

This invention relates to vises, and is particularly concerned with machine vises, such as are employed for holding work during machining operations.

In vises as heretofore constructed, the action of tightening the jaws on to a workpiece stresses or distorts the body or base of the vise and, furthermore, the jaws tend to rise so that the workpiece does not bed down properly. Moreover, this stressing or distortion of the body or base of the vise may affect the machine bed or other mounting on which the vise is fixed.

The present invention has for its object to provide an improved construction of vise whereby the disadvantages referred to may be obviated.

According to the present invention, an improved vise is provided wherein the clamping jaws are supported on a body or base by resilient means adapted to permit movement of the jaws towards the body or base, and wherein the clamping movement of the jaws towards one another is effected by means acting through links or link structures connected to or carrying the jaws and arranged so that, on application of clamping pressure to a workpiece positioned between the jaws, the jaws, together with the workpiece, have a downward component against the action of the resilient means so as to bed the workpiece firmly on a part of the vise supporting the same.

Preferably, downward movement of the jaws against the action of the resilient means is limited by means of stops so that when the workpiece is bedded down by downward movement of the jaws to the extent permitted by the stops, the jaws are rigidly supported to resist any loosening tendency which might otherwise result from forces exerted, for example, by cutting tools. Moreover, as downward movement of the jaws consequent on compression of the resilient means takes place up to the limit imposed by said stops, the magnitude of the downward component for any clamping pressure between the jaws may be predetermined having regard to the compressibility of said resilient means. The pair of links, or link structure connected to or carrying each jaw may extend to a pivot beneath the opposite jaw, and at least one of the pivots is carried by a screw-operated slidable member.

It will be understood that by the arrangement of resiliently mounted jaws and links, the forces exerted by the clamping screw act mainly in a horizontal plane so that, while the links or link structure are in tension, the body or base is in compression only and is therefore not liable to distortion.

One or both jaws, which may be fitted with slips of any suitable design, may be self-aligning or angularly adjustable in either plane.

The invention is hereinafter described, by way of example, with reference to the accompanying diagrammatic drawings, in which:

Fig. 3 is a vertical transverse section on line 3—3 of Fig. 2; and

Fig. 4 is a vertical transverse section on line 4—4 of Fig. 2.

Figure 1:
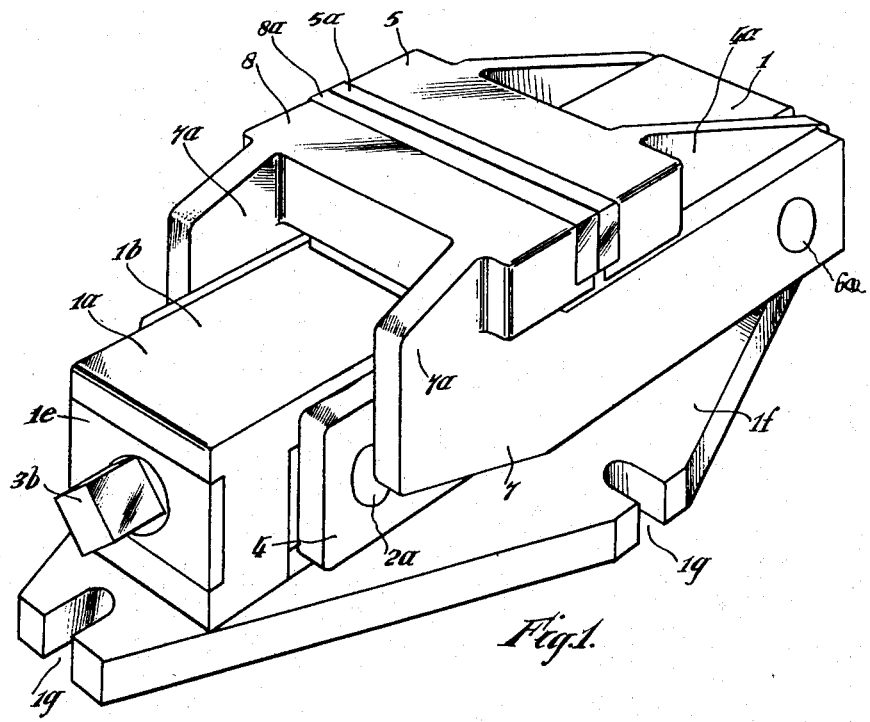
Fig. 1 is a perspective view illustrating one embodiment of vise constructed in accordance with the invention.
Figure 2:
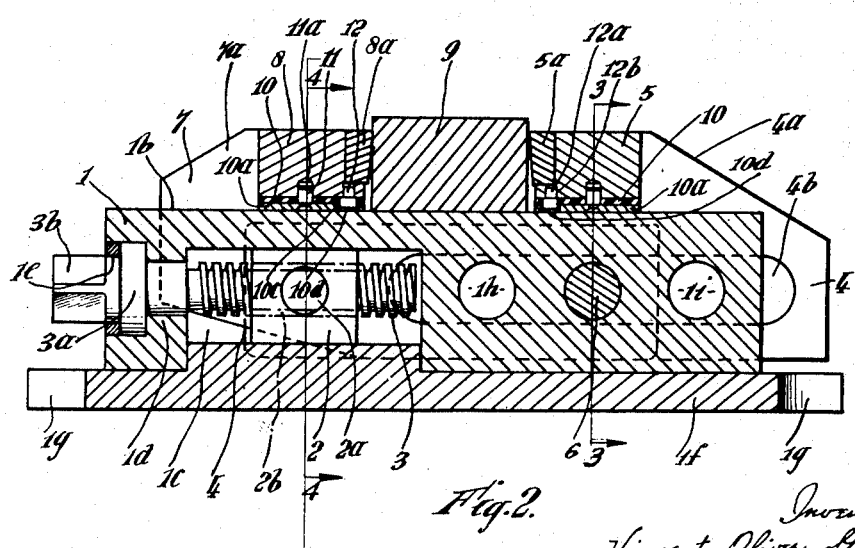
Fig. 2 is a longitudinal section of the vise shown in Fig. 1 but with the jaws separated and engaging a workpiece.

In carrying the invention into effect according to one embodiment, and with reference to the accompanying diagrammatic drawings, the body or base 1 of the improved vise may be in the form of an elongated block 1a of rectangular cross-section and provided with an upper surface 1b in a horizontal plane. The block 1a is formed with an elongated slot 1c extending transversely therethrough for the reception of a slide block 2 which is guided by the upper and lower walls of the slot as seen in Fig. 4 for movement in the axial direction of the body or base 1 and has a trunnion part 2a projecting at each side of the body or base 1. The slide block 2 has a screwthreaded bore 2b for co-operation with a clamping screw 3 suitably flanged at 3a to co-operate with thrust means, such as a shoulder 1d and retaining member 1e at the adjacent end of the body or base 1 and provided with a projection 3b for the mounting of an operating handle of conventional form.

Pivoted to the projecting trunnions 2a on said slide block 2 is a pair of links 4 disposed against the side faces of the block 1a and extending substantially to, or beyond, the opposite end thereof where said links 4 are provided with upwardly extending parts 4a adapted for the support of a transversely extending jaw 5 fitted with an interchangeable or renewable slip 5a in the usual manner. This pair of links 4 is provided with an elongated aperture 4b so that a fixed transverse pivot 6 may extend therethrough, and upon projecting trunnion parts 6a of this pivot 6 are pivotally mounted a second pair of links 7 extending at the outer sides of the first pair of links 4, the links 7 being similarly provided with upstanding parts 7a for the support of the opposite jaw 8 and slip 8a.

It will be understood that the pairs of links 4 and 7 carrying the jaws 5 and 8 extend towards opposite ends of the body or base 1 of the vise and beneath the opposite jaw for pivotal connection respectively to the slide block 2 and pivot 6, and thus the pressure applied to the workpiece 9 by the jaws 5, 8 is exerted at a higher level than the pull applied to the slide block 2 by the screw 3.

The jaws 5 and 8 may be resiliently supported in any suitable manner so as to be depressible in relation to the block 1a, but preferably the resilient supporting means for each jaw comprises a layer 10 of resilient material, such as rubber, bonded or otherwise fixed to a plate 10a which is slidable on the upper surface 1b of the block 1a, the assemblage consisting of the layer 10 and the plate 10a being located in relation to the jaw 5 or 8 by means of pins 11 riveted or otherwise fixed to the plate 10a and slidably engaging corresponding bores 11a in the jaws. For the purpose of limiting downward movement of the jaws 5, 8 against the action of the resilient means suitable stops are provided. For example, the stops may be in the form of members 12 having shank portions 12a fitting into bores 12b in the jaws and having the head part thereof extending into clearance holes 10c, the dimension of the head part being such as to provide a suitable clearance 10d between the end of the member 12 and the surface 1b of the vise.

The effect of the arrangement of links 4, 7 in the manner described is that when clamping pressure is exerted by the jaws 5, 8 on the workpiece 9, the pull on the links at the same time exerts a downward force on the jaws against the action of the resilient rubber layers 10 so that the workpiece 9 is bedded firmly down upon the upper surface 1b of the block 1a.

The limitation of compression of the layers 10 by the stops 12 determines the magnitude of the downward component of the jaws for any clamping pressure between the jaws, it being understood that the stops 12 come into action to arrest downward movement of the jaws only after a predetermined downward component depending on the compressibility of the layer 10 has been exerted. Moreover, after the workpiece 9 is bedded down by tightening the jaws until further downward movement thereof is prevented by the stops 12, the jaws are rigidly supported from the surface 1b and thus resist any tendency to loosening by forces exerted for example by cutting tools in certain directions as might be the case if the jaws were capable of further downward movement against the action of the resilient means after the workpiece was bedded down. The force exerted by the clamping screw 3 is mainly in the horizontal direction so that the body or base 1 is not subject to excessive stress and resulting distortion. The body or base may be fitted at the underside with a base plate 1f provided with slots 1g for facilitating fixing of the vise to a machine table or other mounting.

The effective length of the screw 3 is relatively short and, in order that the capacity of the vise may be increased, the block 1a is provided with additional transverse bores 1h, 1i so that by removing the pivot 6 and inserting it in one or the other of said holes, the capacity of the vise may be decreased or increased as required, the slots 4b in the links 4 being of suitable length for this purpose.

In conclusion, it will be understood that the invention is not limited to the particular embodiment hereinbefore described but that various modifications of the structural detail within the scope of the appended claims are contemplated.

I claim:

1. A vise comprising a body having a workpiece supporting part, relatively movable jaws for clamping a workpiece positioned on said supporting part, resilient means supporting said jaws on said body, a link structure connected to each jaw and extending to a pivot beneath the opposite jaw, and a screw-operated slidable member carrying at least one of said pivots, said link structures being movable about their pivots so that on application of clamping pressure to a workpiece positioned between the jaws, the jaws have a downward component against the action of said resilient means.

2. A vise comprising a body having a workpiece supporting part, relatively movable jaws for clamping a workpiece positioned on said supporting part, resilient means supporting said jaws on said body, a link structure connected to each jaw and extending to a pivot beneath the opposite jaw, a screw-operated slidable member carrying at least one of said pivots, said link structures being movable about their pivots so that on application of clamping pressure to a workpiece positioned between the jaws, the jaws have a downward component against the action of said resilient means, and stop means interposed between said jaws and said body for restricting downward movement of said jaws against the action of said resilient means.

3. A vise comprising a body having a workpiece supporting part, relatively movable jaws for clamping a workpiece positioned on said supporting part, resilient means supporting said jaws on said body, a link structure connected to one jaw and pivoted to trunnions on a slidable block beneath the opposite jaw, a link structure connected to the latter jaw and pivoted to a pivot member located in the vise body beneath the first-mentioned jaw, and a screw device for effecting movement of said slidable block for applying pressure to said jaws.

4. A vise according to claim 3, characterised in that said pivot member is insertable in any one of a number of transverse holes in said vise body.

5. A vise comprising a body having a workpiece supporting part, relatively movable jaws for clamping a workpiece positioned on said supporting part, resilient means supporting said jaws on said body, stop means for limiting downward movement of said jaws against the action of said resilient means, a link structure connected to one jaw and pivoted to trunnions on a slidable block beneath the opposite jaw, a link structure connected to the latter jaw and pivoted to a pivot member located in the vise body beneath the first-mentioned jaw, and a screw device for effecting movement of said slidable block for applying pressure to said jaws.

6. A vise according to claim 5, characterised in that said pivot member is insertable in any one of a number of transverse holes in said vise body.

VINCENT OLIVER STONE.

REFERENCES CITED

The following references are of record in the file of this patent:

UNITED STATES PATENTS

| Number | Name | Date |
| --- | --- | --- |
| 1,454,993 | Bothwell | May 15, 1923 |
| 2,373,384 | Cross et al. | Apr. 10, 1945 |

FOREIGN PATENTS

| Number | Country | Date |
| --- | --- | --- |
| 149,963 | Great Britain | Nov. 7, 1921 |
| 712,241 | Germany | Oct. 15, 1941 |
| 604,643 | Great Britain | July 7, 1948 |